United States Patent
Zhang et al.

(10) Patent No.: US 11,385,150 B2
(45) Date of Patent: Jul. 12, 2022

(54) DOUBLE-LAYER CONCENTRIC LOADING FRAME STRUCTURE SUITABLE FOR TRUE TRIAXIAL TESTING MACHINE

(71) Applicant: Northeastern University, Shenyang (CN)

(72) Inventors: Xiwei Zhang, Shenyang (CN); Xiating Feng, Shenyang (CN); Donghui Ma, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 231 days.

(21) Appl. No.: 16/966,379

(22) PCT Filed: Apr. 28, 2019

(86) PCT No.: PCT/CN2019/084705
§ 371 (c)(1),
(2) Date: Jul. 30, 2020

(87) PCT Pub. No.: WO2020/215343
PCT Pub. Date: Oct. 29, 2020

(65) Prior Publication Data
US 2021/0140861 A1    May 13, 2021

(30) Foreign Application Priority Data
Apr. 22, 2019 (CN) .......................... 201910322625.2

(51) Int. Cl.
*G01N 3/08* (2006.01)

(52) U.S. Cl.
CPC ....... *G01N 3/08* (2013.01); *G01N 2203/0019* (2013.01); *G01N 2203/0256* (2013.01)

(58) Field of Classification Search
CPC combination set(s) only.
See application file for complete search history.

(56) References Cited

U.S. PATENT DOCUMENTS 3,728,895 A     4/1973  Shaw
10,048,183 B2 *  8/2018  Ni ............................ G01N 3/08
(Continued)

FOREIGN PATENT DOCUMENTS

CN    102435503 A    5/2012
CN    102735548 A    10/2012
(Continued)

*Primary Examiner* — Brandi N Hopkins
(74) *Attorney, Agent, or Firm* — Muncy, Geissler, Olds & Lowe, P.C.

(57) ABSTRACT

A double-layer concentric loading frame structure suitable for a true triaxial testing machine includes an inner-layer frame, an outer-layer frame and a base. A square slot hole is formed in a middle part of the inner-layer frame. The inner-layer frame is mounted on the base through a support platform. Actuators are mounted at a top end and a bottom end of the inner-layer frame. The outer-layer frame sleeves the inner-layer frame concentrically. Four actuators are distributed on an outer periphery of the outer-layer frame. A support plate is mounted at the top end of the inner-layer frame, and two lifting driving cylinders are mounted on the support plate. Piston rods of the lifting driving cylinders extend below the support plate and are connected to an upper surface of the outer-layer frame. A guide post is mounted on the upper surface of the outer-layer frame and extends above the support plate.

2 Claims, 2 Drawing Sheets

(56) References Cited

U.S. PATENT DOCUMENTS

| | | | | |
|---|---|---|---|---|
| 2011/0107844 | A1* | 5/2011 | Secq | ........................ E21B 21/08 |
| | | | | 73/825 |
| 2018/0136099 | A1* | 5/2018 | Zhou | ......................... G01N 3/02 |
| 2018/0313727 | A1* | 11/2018 | Feng | ......................... G01N 3/12 |

FOREIGN PATENT DOCUMENTS

| | | | |
|---|---|---|---|
| CN | 103822831 | A | 5/2014 |
| CN | 106248487 | A | 12/2016 |
| CN | 106289995 | A | 1/2017 |
| CN | 106596281 | A | 4/2017 |
| CN | 107941615 | A | 4/2018 |
| CN | 108918284 | A | 11/2018 |
| CN | 108982228 | A | 12/2018 |

\* cited by examiner

DOUBLE-LAYER CONCENTRIC LOADING FRAME STRUCTURE SUITABLE FOR TRUE TRIAXIAL TESTING MACHINE

BACKGROUND OF THE INVENTION

1. Field of the Invention

The present invention relates to a hard rock true triaxial testing machine, and more particularly to a double-layer concentric loading frame structure suitable for a true triaxial testing machine.

2. The Prior Arts

For deep rock engineering, such as deep mining, deep hydropower cavern excavation, deep shale gas exploitation and deep geothermal development, rock mass is generally changed into the surface stress state ($\sigma_1 > \sigma_2 > \sigma_3 = 0$) of surrounding rocks in underground engineering from the initial general stress state ($\sigma_1 > \sigma_2 > \sigma_3 > 0$, $\sigma_1$ is maximum principal stress, $\sigma_2$ is intermediate principal stress, and $\sigma_3$ is minimum principal stress) in three orthogonal directions. Not only the rocks in the construction and excavation period and the engineering operation period are subjected to static deformation and fracture, as well as long-term time dependent rheological induced deformation and fracture, but also the rocks are subjected to new fracture and minor fault instability caused by low-frequency disturbance stress.

The stiffness of a loading frame for a true triaxial testing machine directly affects the post-peak mechanical behavior of the rock that is fractured under the compression condition. If the designed stiffness of a carbon steel material loading frame is too low, elastic energy stored in the loading frame for the testing machine can be released at the moment of rock fracture, and forms elastic shock waves. And the rock fracture can be accelerated, and the risks of damage to equipment and persons by flying rock in the testing process can be caused. For this purpose, in the stiffness design of the loading frame for the rock true triaxial testing machine, generally the suggested value 5 MN/mm in Draft ISRM Suggested Method in 1999 for the complete stress-strain curve for intact rocks in uniaxial compression can be referred as a design standard. After the suggested value 5 MN/mm is applied to some rock conventional triaxial testing machines or true triaxial testing machines, it has been found that a complete stress-strain curve with fragility feature after breaking is difficult to obtain for some very hard rocks; and for middle and high hardness rocks, an excellent servo feedback control system needs to be matched for making up the stiffness insufficiency.

According to a rigid servo-actuated loading frame structure disclosed by the Chinese patent with the publication number of CN103822831A, and a high-pressure true triaxial hard rock constant-temperature season cracking testing device and method disclosed by the Chinese patent with the publication number of CN106596281A, though the problems of hard rock true triaxial loading and testing methods are solved at different levels, the frame loading structure can also meet the design requirements of a conventional testing machine, but the shortcomings of space waste, non-compact structure, high frame span and stiffness, and limited lifting capacity also exist.

SUMMARY OF THE INVENTION

A primary objective of the present invention is to provide a double-layer concentric loading frame structure suitable for a true triaxial testing machine, which has the characteristics of space saving, compact structure, small frame span and obvious improvement of stiffness.

To achieve the above objective, the present invention provides a double-layer concentric loading frame structure suitable for a true triaxial testing machine comprising an inner-layer frame, an outer-layer frame and a base.

The inner-layer frame is a cylindrical structure, a square slot hole in a horizontal direction is formed in a middle part of the inner-layer frame, a rock specimen mounting box is placed in the square slot hole, and circular loading rod through holes in a horizontal direction are formed on two side walls of the square slot hole.

The inner-layer frame is vertically mounted on the base, a support platform is arranged between a bottom portion of the inner-layer frame and the base, a first actuator is vertically mounted at a top end of the inner-layer frame, a second actuator is vertically mounted at a bottom end of the inner-layer frame, and the second actuator is located on an inner side of the support platform.

The outer-layer frame is a circular ring structure, and sleeves the inner-layer frame concentrically, and a circumferential clearance is formed between the outer-layer frame and the inner-layer frame.

A third actuator, a fourth actuator, a fifth actuator and a sixth actuator are horizontally mounted on an outer periphery of the outer-layer frame, and the third actuator, the fourth actuator, the fifth actuator and the sixth actuator are uniformly distributed on the outer-layer frame.

A support plate is fixedly mounted at the top end of the inner-layer frame, a first lifting driving cylinder and a second lifting driving cylinder are vertically mounted on the support plate, and the first lifting driving cylinder and the second lifting driving cylinder are distributed along a diagonal line of the support plate.

Piston rods of the first lifting driving cylinder and the second lifting driving cylinder extend below the support plate, and are fixedly connected to an upper surface of the outer-layer frame.

A guide post is vertically and fixedly mounted on the upper surface of the outer-layer frame, a guide hole is formed on the support plate, and the guide post penetrates through the guide hole and extends above the support plate.

An auxiliary support lug plate is fixedly mounted on the outer-layer frame, and the outer-layer frame is fixed on a ground through the auxiliary support lug plate in a loading process.

The double-layer concentric loading frame structure has the beneficial effects that:

After a hard rock true triaxial testing machine installs a double-layer concentric loading frame structure provided by the present invention, a machining process can be simplified effectively, the usage amount of steel is reduced, and the structure is more compact. And besides, the stiffness of the loading frame in three principal stress directions is improved effectively. Through cooperation with a closed-loop servo feedback control technology, the requirements of hard rocks after rock fracture can be met effectively. The quality of hard rock compression fracture testing data can be improved completely.

The loading frame structure provided by the present invention breaks through the design thought of a traditional rectangular frame structure through the double-layer concentric structure which is designed innovatively, under the equivalent load condition, compared with the traditional rectangular frame structure, for the loading frame structure provided by the present invention, 21.5% of space can be saved, so that the compact structure condition is created. Under the equivalent tonnage condition, compared with a traditional upright column frame, for the inner-layer frame, the effective cross-sectional area can be enlarged by about 200%, which is a key factor for improving the stiffness of the loading frame structure. Because the inner-layer frame is a cylindrical structure, the span of the loading frame structure is farthest decreased, and the span decrease is also another key factor for improving the stiffness of the loading frame structure; and the loading frame structure provided by the present invention has the stiffness of no less than 10 MN/mm in any principal stress direction, and the stiffness can be up to 20 MN/mm.

DETAILED DESCRIPTION OF THE PREFERRED EMBODIMENT

Figure 1:
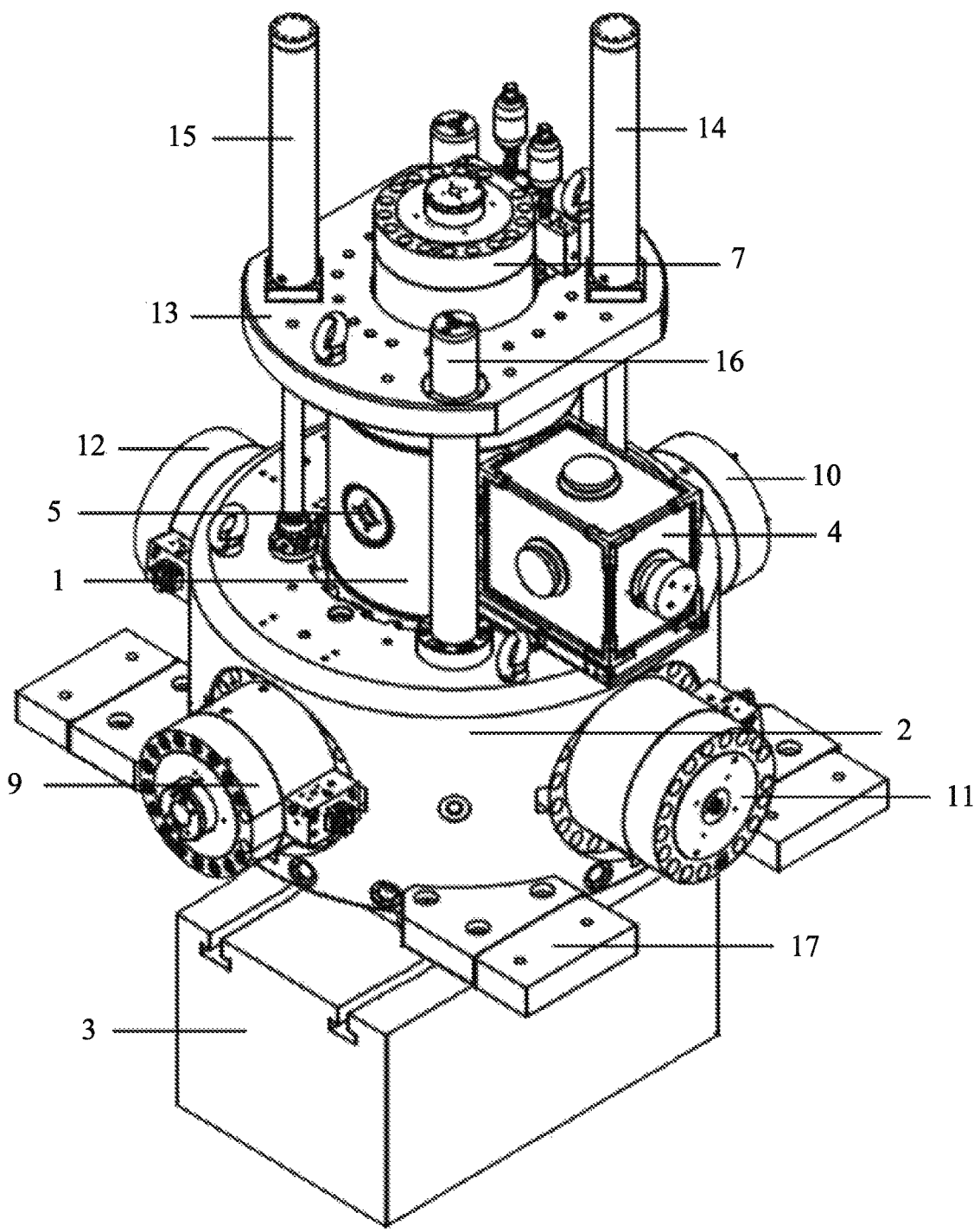
FIG. 1 is a schematic diagram of a double-layer concentric loading frame structure for a true triaxial testing machine (the rock sample box installation status)

The detailed description of the present invention is given below in combination with the drawing and the embodiments of the invention.

Figure 2:
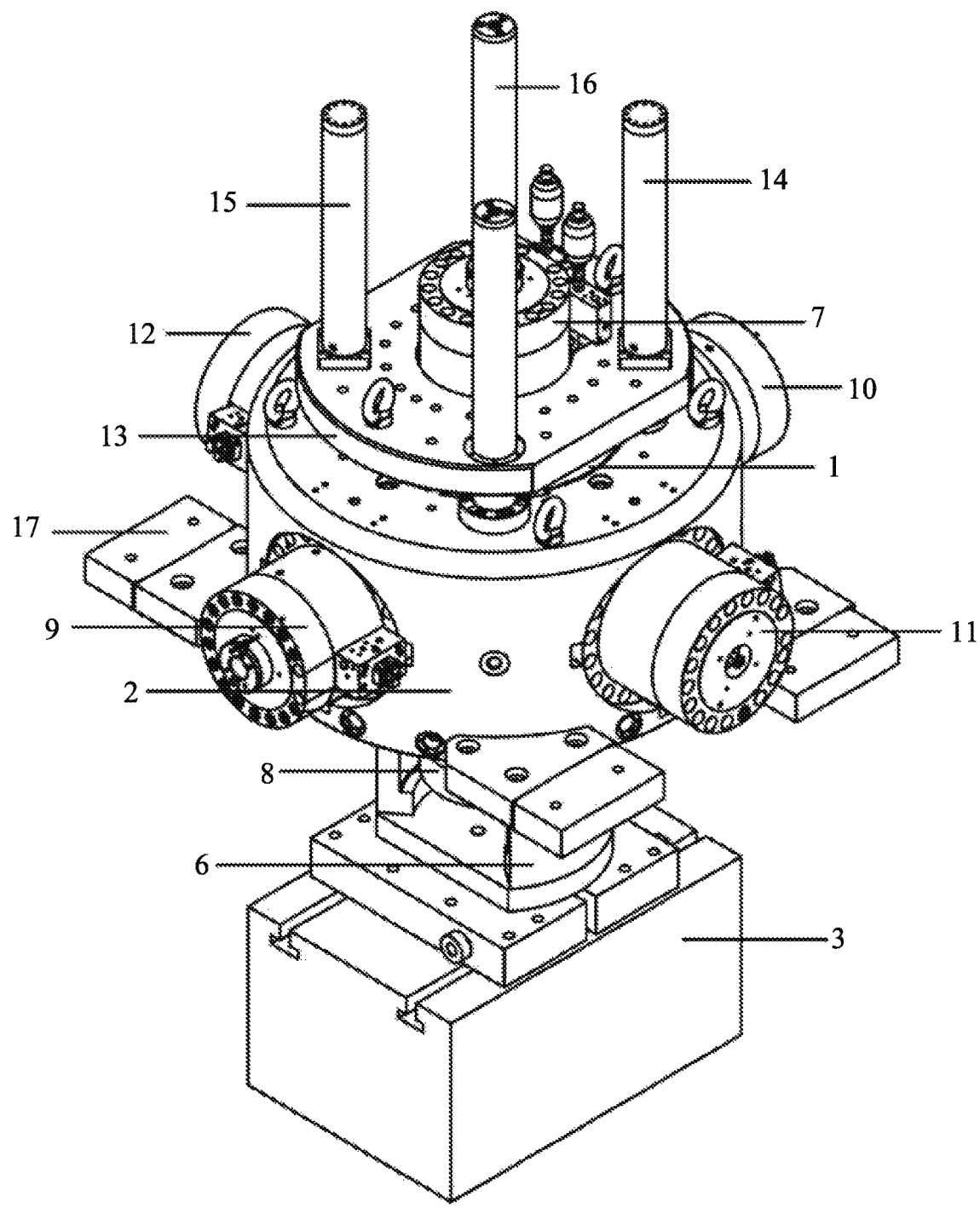
FIG. 2 is a schematic diagram of the double-layer concentric loading frame structure for the true triaxial testing machine (the rock sample in the true triaxial stress compression status)

As shown in FIGS. 1 and 2, a double-layer concentric loading frame structure suitable for a true triaxial testing machine comprises an inner-layer frame 1, an outer-layer frame 2 and a base 3. The inner-layer frame 1 is a cylindrical structure, a square slot hole in a horizontal direction is formed in a middle part of the inner-layer frame 1, a rock specimen mounting box 4 is placed in the square slot hole, and circular loading rod through holes 5 in a horizontal direction are formed on two side walls of the square slot hole. the inner-layer frame 1 is vertically mounted on the base 3, and a support platform 6 is arranged between a bottom portion of the inner-layer frame 1 and the base 3, a first actuator 7 is vertically mounted at a top end of the inner-layer frame 1, a second actuator 8 is vertically mounted at a bottom end of the inner-layer frame 1, and the second actuator 8 is located on an inner side of the support platform 6. The outer-layer frame 2 is a circular ring structure, and sleeves the inner-layer frame 1 concentrically, and a circumferential clearance is formed between the outer-layer frame 2 and the inner-layer frame 1. A third actuator 9, a fourth actuator 10, a fifth actuator 11 and a sixth actuator 12 are horizontally mounted on an outer periphery of the outer-layer frame 2, and the third actuator 9, the fourth actuator 10, the fifth actuator 11 and the sixth actuator 12 are uniformly distributed on the outer-layer frame 2. A support plate 13 is fixedly mounted at the top end of the inner-layer frame 1, a first lifting driving cylinder 14 and a second lifting driving cylinder 15 are vertically mounted on the support plate 13, and the first lifting driving cylinder 14 and the second lifting driving cylinder 15 are distributed along a diagonal line of the support plate 13. Piston rods of the first lifting driving cylinder 14 and the second lifting driving cylinder 15 extend below the support plate 13, and are fixedly connected to an upper surface of the outer-layer frame 2. A guide post 16 is vertically and fixedly mounted on the upper surface of the outer-layer frame 2, a guide hole is formed on the support plate 13, and the guide post 16 penetrates through the guide hole and extends above the support plate 13.

An auxiliary support lug plate 17 is fixedly mounted on the outer-layer frame 2, and the outer-layer frame 2 is fixed on a ground through the auxiliary support lug plate 17 in a loading process.

The description of the single-use process of the double-layer concentric loading frame structure is given below in combination with the drawings:

In this embodiment, the inner-layer frame 1 and the outer-layer frame 2 are both manufactured through an alloy steel forging and heat treatment process, which is the basis of ensuring that the stiffness of the inner-layer frame 1 and the outer-layer frame 2 are not less than 10 MN/mm. In order to ensure concentricity between the inner-layer frame 1 and the outer-layer frame 2, the circumferential clearance formed between the outer-layer frame 2 and the inner-layer frame 1 is designed to be 10 mm; and in order to monitor the change of the circumferential clearance, a displacement sensor can be mounted between the inner-layer frame 1 and the outer-layer frame 2. A rock specimen mounting box 4 is a guide structure coordinated with the square slot hole in the middle part of the inner-layer frame 1 so as to achieve quick mounting and positioning of the rock specimen mounting box 4.

As shown in FIG. 1, before loading test, all the piston rods of the first actuator 7, the second actuator 8, the third actuator 9, the fourth actuator 10, the fifth actuator 11 and the sixth actuator 12 are in a retracted state, and the first lifting driving cylinder 14 and the second lifting driving cylinder 15 are in an external-extension state; and the outer-layer frame 2 is at a lower position, and at this time, the square slot hole in the middle part of the inner-layer frame 1 is exposed.

Next, the rock specimen mounting box 4 with a rock specimen is firstly inserted into the square slot hole and mounted in place, and then the piston rods of the first lifting driving cylinder 14 and the second lifting driving cylinder 15 are controlled to retract upwards; the outer-layer frame 2 is gradually lifted to a higher position, until the third actuator 9, the fourth actuator 10, the fifth actuator 11, the sixth actuator 12 and the rock specimen mounting box 4 are at the same level. Besides, the piston rods of the third actuator 9 and the fourth actuator 10 coincide with an axial center line of the circular loading rod through hole 5; and finally, an external support is mounted between the auxiliary support lug plate 17 and the ground, and the fixation between the outer-layer frame 2 and the ground is finished.

After completion of all current preparatory works, hard rock true triaxial static test, hard rock true triaxial rheolytic test and hard rock true triaxial quasi-dynamic test are finished according to the actual test plan requirements separately.

The scheme in the embodiment is not used for limiting the protection range of the patent, and any equivalent implementation or change which is not separated from the invention is included in the patent range of the scheme.

What is claimed is:

1. A double-layer concentric loading frame structure suitable for a true triaxial testing machine, comprising an inner-layer frame, an outer-layer frame and a base;
   wherein the inner-layer frame is a cylindrical structure, a square slot hole in a horizontal direction is formed in a middle part of the inner-layer frame, a rock specimen mounting box is placed in the square slot hole, and circular loading rod through holes in a horizontal direction are formed on two side walls of the square slot hole;

wherein the inner-layer frame is vertically mounted on the base, a support platform is arranged between a bottom portion of the inner-layer frame and the base, a first actuator is vertically mounted at a top end of the inner-layer frame, a second actuator is vertically mounted at a bottom end of the inner-layer frame, and the second actuator is located on an inner side of the support platform;

wherein the outer-layer frame is a circular ring structure, and sleeves the inner-layer frame concentrically, and a circumferential clearance is formed between the outer-layer frame and the inner-layer frame;

wherein a third actuator, a fourth actuator, a fifth actuator and a sixth actuator are horizontally mounted on an outer periphery of the outer-layer frame, and the third actuator, the fourth actuator, the fifth actuator and the sixth actuator are uniformly distributed on the outer-layer frame;

wherein a support plate is fixedly mounted at the top end of the inner-layer frame, a first lifting driving cylinder and a second lifting driving cylinder are vertically mounted on the support plate, and the first lifting driving cylinder and the second lifting driving cylinder are distributed along a diagonal line of the support plate;

wherein piston rods of the first lifting driving cylinder and the second lifting driving cylinder extend below the support plate, and are fixedly connected to an upper surface of the outer-layer frame; and wherein a guide post is vertically and fixedly mounted on the upper surface of the outer-layer frame, a guide hole is formed on the support plate, and the guide post penetrates through the guide hole and extends above the support plate.

2. The double-layer concentric loading frame structure of claim 1, wherein an auxiliary support lug plate is fixedly mounted on the outer-layer frame, and the outer-layer frame is fixed on a ground through the auxiliary support lug plate in a loading process.

\* \* \* \* \*